United States Patent
Osher et al.

(10) Patent No.: US 7,031,538 B2
(45) Date of Patent: Apr. 18, 2006

(54) METHOD AND APPARATUS FOR FEATURE-BASED QUANTIZATION AND COMPRESSION OF DATA

(75) Inventors: Stanley Osher, Pacific Palisades, CA (US); Li-Tien Cheng, Los Angeles, CA (US); Barry Merriman, Los Angeles, CA (US); Hong-Kai Zhao, Irvine, CA (US); Haomin Zhou, Pasadena, CA (US)

(73) Assignee: Level Set Systems, Inc., Pacific Palisades, CA (US)

( * ) Notice: Subject to any disclaimer, the term of this patent is extended or adjusted under 35 U.S.C. 154(b) by 672 days.

(21) Appl. No.: 09/737,834

(22) Filed: Dec. 14, 2000

(65) Prior Publication Data

US 2001/0046327 A1 Nov. 29, 2001

Related U.S. Application Data

(60) Provisional application No. 60/172,542, filed on Dec. 17, 1999.

(51) Int. Cl.
*G06K 9/36* (2006.01)

(52) U.S. Cl. ............. 382/243; 382/251; 345/442

(58) Field of Classification Search ............ 382/100, 382/253, 232, 243, 236, 240, 250, 108, 123, 382/168, 169, 191, 199, 203, 221, 237, 242–248, 382/251, 256, 268, 276, 286–291, 305; 345/419, 345/423, 424, 442, 420; 702/190; 341/50, 341/51; 358/426.13; 348/395, 405
See application file for complete search history.

(56) References Cited

U.S. PATENT DOCUMENTS 6,433,707 B1 * 8/2002 Crandall ............... 341/50

* cited by examiner

*Primary Examiner*—Daniel Miriam
*Assistant Examiner*—Seyed Azarian
(74) *Attorney, Agent, or Firm*—Michael J. Bell; Howrey LLP (57) ABSTRACT

A method and apparatus for compression and restoration of images, videos, surfaces, curves and, generally, pixel-based data sets, including: feature-based quantization using a set of N isocontours; compressing each of these N contours using a level set-based compression of curves or surfaces—and/or combining the quantization with a conventional method for compression of surfaces; and decompressing the compressed data using a nonoscillatory reconstruction. The method is naturally multiscale, but does not use wavelets or other multiscale-basis functions. The method performs compression and decompression (1) without excessive computational complexity, even in the presence of topological changes such as merging or breaking of isocontours as the scale changes, (2) with excellent image fidelity, (3) without unacceptable artifacts such as ringing, blurring, or blocking, (4) with simple and natural grid based ways of calculating geometric features such as normals, principal curvatures.

5 Claims, 7 Drawing Sheets

METHOD AND APPARATUS FOR FEATURE-BASED QUANTIZATION AND COMPRESSION OF DATA

This patent application claims priority to U.S. Provisional Patent Application No. 60/172,542 of Osher, et al. filed Dec. 17, 1999, entitled "Feature Based Quantization, Compression of Curves and Surfaces Using a Level Set Technique, Compression and Decompression of Images and Videos Using Feature Based Quantization and Level Set Based Compression of Curves and Surfaces", which is incorporated herein by reference.

The present invention relates to a method for quantization, compression and retrieval and decompression of digital images, videos, and other, pixel-based data. The objective is to preserve desirable features and fidelity for lossy high compression ratios using geometric/feature-based quantization, compressing the resulting isocontours and retrieving/decompressing without introducing spurious artifacts.

BACKGROUND OF THE INVENTION

A fundamental goal of compression is to reduce the amount of data necessary to represent the original object, while maintaining fidelity and important features. Examples of important applications include: data transmission, data storage and data retrieval.

Many existing methods are of limited use because they cannot achieve a high compression ratio with good image fidelity, or because they do not have tractable computational complexity. For many methods high compression ratios may introduce unacceptable artifacts such as: ringing, blurring or blocking. Compression of curves or surfaces using standard methods such as NURBS (for "non-uniform rational B-splines"; see, e.g., Rogers, D. F., *An Introduction to NURBS: with Historical Perspective*, Morgan-Kaufmann (2000), which is incorporated herein by reference) becomes difficult if the curves or surfaces are deformed (even slightly) so as to change topology. This may occur, for instance, if the viewing resolution is changed. Moreover, standard curve or surface compression methods do not allow for computational ease in computing geometric properties of the curve or surface, e.g., normals and curvatures.

Standard quantization techniques do not take into account geometrical properties of the features, e.g., edges, textures. For example, a widely used standard quantization method divides the intensity range into equal integer values and blindly converts the intensity values to the nearest integers. Another popular method equalizes the area histogram. These methods often lead to loss of important features.

SUMMARY OF THE INVENTION

In accordance with the present invention, a method is provided for a feature-based quantization system that generates a compressed version of the original data. One advantage is that the method of the invention preserves desirable features such as local total variation, curvatures, arc length, surface area or whatever is viewed as important by the user as much as possible after compression.

The inventive method compresses curves or surfaces in a way that can handle topological changes such as merging and breaking, and easily evaluates the geometrical quantities of the compressed curves or surfaces, in an efficient multi-resolution fashion.

In addition, a the method of the invention merges the quantization and curve or surface compression methods into a simple and general compression of pixel-based data, retaining the advantages of both the new quantization and curve/surface compression, insofar as the curve/surface compression method is applied to the isocontours of the original data set, selected by the quantization algorithm.

The method of the invention also retrieves and decompresses the compressed data via an artifact-free, nonoscillatory reconstruction.

A preferred embodiment of the invention includes: (1) a feature-based quantization method to quantize the image, video or general pixel based data set, obtaining N isocontours which we shall denote as being curves/surfaces, although their dimension is arbitrary, one less than that of the original data set; (2) a compression method for curves/surfaces using a level set based method (although, in a less preferred embodiment, other methods could be used to compress the surface); and (3) reconstruction of the data set using essentially nonoscillatory (ENO) reconstruction (including piecewise linear reconstruction) from the compressed isocontours using the distance function between isocontours, or alternatively, inverting numerically a partial differential equation, such as Laplace's equation, with the known constant data given on the isocontours. (For a discussion of ENO reconstruction, see Harten, A., Osher, S. J., Engquist, B. E. and Chakravarthy, S. R., *Some Results on Uniformly High-Order Accurate Essentially Nonoscillatory Schemes*, Journal of Applied Numerical Mathematics, Vol. 2, pp. 347–377, which is incorporated herein by reference.)

The compression of a digital (pixel based) data set is achieved by first performing a feature-based quantization. Examples of geometrical quantities that can be used include: (1) area, (2) total variation, (TV), (3) surface area, (4) curvature of isosurfaces, or (5) combinations thereof. Data quantization refers to converting the data values, which may be numerous, into a certain smaller set of values. The choice of these values strongly affects the quality of the resulting quantized data set. Geometric quantities are (easily) computed and used here to define measures that can characterize the importance of the features. A histogram of the original data set is constructed according to the chosen measure. The histogram is divided evenly into N bins, where the positive integer N is determined by the desired resolution or compression rate of the quantized data. Then, the N most significant set of values, which are the centers of the equal histogram bins in the chosen measure, are selected as the final quantized values, and real image values are converted to them. Values are thus concentrated near features and each intensity value in the quantized data set has equal area with respect to the chosen measure. The quantization method can be used as a preprocessing technique for other, standard digital data compressions. It may also be combined with standard data compression in its quantization step. Since this quantization method is data dependent, in order to obtain reconstruction later, the N centers of the quantization bins have to be stored, e.g., each as a header of the quantized image. The geometric properties of these isocontours can also be stored and can be used for data retrieval. Each bin can be identified with the two level contours of the data that bound all the intensity values in the bin from above and below.

Curve/surface compression is designed to reduce the amount of data needed to represent the original object, while maintaining geometric fidelity. Black-white or binary data sets can be included as collections of isocontours and thus such curve/surface compression applies to such data. In this invention a level set technique is used to construct a multilevel representation of the curve/surface. On level set techniques, see Osher, S. and Fedkiw, R. P., *Level Set Methods: An Overview and Some Recent Results*, UCLA CAM Report 00-08 (February 2000), which is incorporated herein by reference.

The number of levels decreases with the compression rate. First, the curve/surface is defined as a level contour (preferably, the zero-level contour) of a smooth (Lipschitz continuous) function, i.e. the level set function. Then a piecewise polynomial approximation of the curve/surface with the aid of this smooth function based on multilevel nonuniform grids is constructed. A dyadic decomposition of the multidimensional rectangular domain is used, and a given error tolerance is enforced as a stopping criterion for recurrent division. This yields a multiresolution representation of the level set function as well as of its level sets, one of which is the compressed version of the original curve/surface. The reduced number of data points and level set values at these points are encoded using standard techniques such as Huffman coding.

The decompression (data retrieval) of the compressed data set is now done using some nonoscillatory reconstruction such as (1) piecewise linear or ENO interpolation using the distance function between the compressed isocontours, or (2) inverting numerically a partial differential equation, e.g., Laplace's equation, with the data given on the N isocontours.

Variations and generalizations of embodiments of the invention will be apparent in the course of the description below. Generally, a method according to the invention quantizes an image, video or general data set defined by pixel values. This is a feature-based quantization, where geometric quantities such as area, curvature, local total variation, arclength or surface area of isocontours (or more generally, contours), are used to define a measure. A histogram of the data is constructed and divided into (preferably equal) bins according to the measure. The number of these bins may be determined by the compression rate selected by the user of the computer-based system.

Centers of the equal histogram bins are preferably selected as the most significant set of values for quantization, and the input data in each histogram bin is converted to these corresponding values, which are isocontours of the quantized image. These N quantities can be stored as a header of the quantized image. The geometric properties of these contours can also be stored, and can be used for retrieval. Each bin can be identified with two isocontours of the data, which bound all intensity values in the bin from above and below.

A level set-based technique using a grid is preferably used for the compression of curves and surfaces (hereinafter, where either term "curve" or "surface" is used, the other may alternatively be used), where the curve or surface is first represented as the zero-level set of a real valued function, such as signed distance to the curve or surface. This function is defined at grid locations.

In addition, a multiresolution representation of the curve or surface using a dyadic division of the multidimensional rectangular domain is preferably generated, until a desired (e.g. user-defined or automatically generated) level of accuracy is achieved. An approximation of the zero-level contour, i.e., the original curve or surface in each subdivided box, is in a preferred embodiment based on an interpolant of the scalar function.

The information stored is preferably an encoded version (using, for example, Huffman coding), of the values of the approximating level set function at the nodes characterizing the multiresolution dyadic decomposition from which a piecewise smooth (for example, linear) interpolant yields the approximating level set function. Combining the foregoing method features provides feature-based compression for images, videos, and other general data sets.

In preferred embodiments, isocontours of the data set can be selected whose values equally divide the histogram according to the feature-based measure.

The (iso-)curves or (iso-)surfaces may be further compressed in accordance with the compression methods of the invention, effectively further compressing the original data set.

A decompression and reconstruction method of the invention uses the decompressed curves, which are isocontours of the approximating level set functions, together with their constant values on each isocontour via linear or other essentially nonoscillatory reconstruction or interpolation, or other partial differential-based numerical method, such as solving Laplace's equation approximately with the constant values given on isocontours.

DESCRIPTION OF THE PREFERRED EMBODIMENTS

The following discussion is a general description of the subject matter of the present invention. This appeared in the text of the Provisional Patent Application upon which the present application is based, and it is in turn followed by a more specific description of preferred embodiments of the invention.

It will be appreciated that the methods of the invention can be implemented in conventional processor-based systems, and stored on conventional media, such as on disk or tape, or in volatile or non-volatile memory. Thus, the present inventive methods may be implemented in standard computer hardware or software, or a combination of both. In particular, the methods (such as those represented by the flow charts of FIGS. 1 and 5), or any steps thereof, can be implemented as software programs or program modules, applets or the like for storage, compilation and running on conventional computer systems, and alternatively may be implemented in whole or in part as firmware or hardware circuits or chips that carry out the method steps. The term "module" as used herein may thus refer to such hardware, firmware and/or software, alone or in combination as suitable, to carry out a given method step as described.

The various data, quantities, etc. discussed below may be stored in conventional media and/or hardware, and any necessary calculations, manipulation of information, images or the like can thus be carried out by computer systems as discussed above.

A feature (geometrically) based quantization system applied to input data such as image data is used to generate a compressed version of the original data. Geometric quantities are used to define a measure that can characterize the importance of the features. Then the most significant finite set of values is selected, which are the centers of equal histogram bins in these measures. The input data is converted to this smaller set of data.

Standard curve and surface compression algorithms involve representing the curve or surface using basis functions such as NURBS, and compress the representation. A level set based technique using a grid in order to compress curves or surfaces is introduced here. This has advantages over the standard techniques as follows. First, the compression can gracefully handle topological changes such as breaking or merging, which occur, e.g. as the scale is changed, or if the curve or a surface is slightly deformed. Second, geometric quantities defined on the compressed surface or curve can be easily evaluated by this implicit, grid-based technique. Third, the technique has a multiresolution representation, which makes it unique among implicit curve and surface representations and compression algorithms. Feature-based quantization is used to select N contour curves (for images) or surfaces (for videos), or for more general data sets.

These curves are next compressed using level set based compression of curves and surfaces. An alternative is to use another method to compress these curves. The image or video is decompressed using a nonoscillatory interpolation of the set of N constant data which is given on the N contours. The method gives an artifact free, feature-based compression and decompression.

A fundamental goal of compression is to reduce the amount of data necessary to represent the original object while maintaining acceptable fidelity. Examples of important applications include data transmission, data storage and data retrieval.

Many of the existing methods are not useful because they cannot achieve a high compression ratio with good image fidelity or because they do not have tractable computational complexity. For many methods, high compression ratios may introduce unacceptable artifacts such as ringing, blurring or blocking.

The quantization described here is feature-oriented, i.e., based on the geometry of the data, such as size of shapes and intensity values. In general, the data features, which usually can be characterized mathematically by geometric quantities are important and interesting. For instance, it is very important to retain the sharp boundaries of objects when an image is compressed. Most of the existing compression methods produce fuzzy boundaries i.e. edge effects, especially for high compression ratios. We first list some important geometric quantities and use them in our feature-based quantization.

We use the following geometric terms to characterize the features of the data:
   (i) Area: This represents the size of features with a certain intensity level
   (ii) Total Variation (TV): This represents the total amount that the data varies
   (iii) Arclength of curves or area of surfaces
   (iv) Curvature of level curves or surfaces of the data Image quantization refers to converting the real data values, which could be thought of as having an infinite or a very large number of possible values, to a certain finite and smaller set of values. The choice of these values strongly affects the quality of the resulting image.

In most of the standard quantization methods, the geometric properties of the features are not taken into consideration. For example, the standard scalar quantization method divides the intensity range into equal integer values and blindly converts the intensity values to the nearest integers. This usually leads to the loss of important features in the quantized images.

An important advantage of feature-based quantization according to the present invention is the retention of the most significant and important features in the quantized data (e.g., in images) by selecting the smaller set of values so as to preserve features. The way we accomplish it is to use the above introduced geometric quantities to define measures which can characterize the importance of the features, then select the most significant finite set of values, which are the centers of the equal histogram bins in these measures, and convert the real image values to them. Values are concentrated near features. We now use the following two examples to illustrate our approach.

The first example we show here is based on the area features. We define a measure by:

$$M_{area}(x) = \text{Area}\{u: u \text{ is less than or equal to } x\}.$$

Suppose N is a given integer, which is the number of intensity values we can have in the quantized images. How do we select the N values? We choose these N values in a way such that all intensity values in the quantized image have equal area. More precisely, we equally partition the area into N bins, then select the centers of these N bins as our target quantized intensity values.

The implementation can be carried out as follows: these N numbers can be easily computed by a histogram equalization in the measure of area.

This area histogram equalization approach has been used in some quantization methods in the past, e.g. as described in Sapiro, G. and Caselles, V., *Histogram Modification via Differential Equations, Journal of Differential Equations*, Vol. 135, No. 2, pp. 238–268 (1997) (this Vol. 135, No. 2 is incorporated herein by reference). For instance, most statistical quantization methods based on the probability distribution can be interpreted in this way. In fact, if we normalize the measure $M_{area}(x)$ by the total area, i.e. use $M_{area}(x)/$(total area) as the measure, we have the probability distribution of the intensity value x. Therefore, the histogram equalization in the probability space is the same as the histogram equalization in the measure $M_{area}(x)$.

One disadvantage of this measure is that it may not be able to capture the features with large contrast variance, which the human visual system recognizes. This includes for example, objects with high variance in intensity but having a small area. In order to capture the high variance features as well as the large area features, we introduce a better measure defined by:

$$M_{TV}(x) = \alpha(\text{number of } u_{ij}) + \text{sum } TV(u_{ij}) \text{ for } u_{ij} < x,$$

where $\alpha$ is a positive parameter used to balance the importance of the two different kinds of features: features with large area and features with high contrast variance.

As in the previous example, we can equally partition the intensity values into N bins in this measure $M_{TV}(x)$, then select the centers of these bins as our target quantized intensity values.

In implementation, we just need to compute the variation at each pixel and add it to $\alpha$ times its area, which is one for each individual pixel. Then, we find the histogram equalization of this measure, and select the centers of the histogram bins as the N values.

The variation at each pixel is defined to be the gradient or an approximation to the gradient. In two-dimensional arrays $u_{ij}$, i,j taking on discrete values, we may take other approximations to the variation such as $$\sqrt{(u_{i,j} - u_{i-1,j})^2 + (u_{i,j} - u_{i,j-1})^2},$$

$$\sqrt{\left(\frac{u_{i+1,j} - u_{i-1,j}}{2}\right)^2 + \left(\frac{u_{i,j+1} - u_{i,j-1}}{2}\right)^2},$$

$$|u_{i+1,j} - u_{ij}| + |u_{i,j+1} - u_{ij}|,$$

etc., might be used. In general, representations of or approximations to the variations of the curve (or surface, etc.) at the given point(s) or region(s) will be suitable.

Characteristics of this quantization method include the following:

(a) This general quantization approach can also use other measures, including, for example, approximations to the curvature of the level contours of the data, for the histogram equalization.

(b) This quantization method can be used as a preprocessing technique for standard image compression. It can also be combined with standard image compression processing in its quantization step.

(c) The geometric quantities are local and easy to compute, as we showed above for the variation.

(d) These techniques can be used for quantization, compression and retrieval of higher dimensional data.

Since this quantization method is data dependent, in order to get perfect reconstruction, the N centers of the equalization bins have to be stored. For instance, these N quantities can be stored as a header of the quantized image. The geometric properties of these contours can also be stored and can be used for retrieval.

Each bin can be identified with the two level contours of the data that bound all the intensity values in the bin from above and below.

A fundamental goal of surface and curve compression is to reduce the amount of data necessary to represent the original object, while maintaining image fidelity. Black-white, or binary images can be identified as collections of curves, so curve compression applies to such images. Examples of important applications include transmission, storage and retrieval.

Standard existing algorithms have difficulties with breaking, merging or any other topological changes that occur when the data is perturbed, and with extracting accurate geometric information such as curvatures, normals, etc. Standard implicit algorithms do not have a simple multi-resolution representation.

Suppose we are given a curve in $R^2$ (for surfaces in $R^3$, the algorithm can be similarly constructed); our goal is to compress this curve. We will use level set techniques to construct a multiresolution representation of the curve. Thus, we can use the coarse level representation as the compressed version of the curve. The idea is to embed the curve as a level contour (usually the zero-level contour) of a smooth function, then use a piecewise polynomial approximation of this smooth function based on multi-level non-uniform grids, therefore we approximate the curve as the zero-level set of this compressed function.

The method includes the following three steps:

Step 1: Represent the curve as the zero-level contour of a smooth function such as the signed distance function. We can achieve this by using level set distance reinitialization or interpolation.

Step 2: Compute the multiresolution representation of the smooth function, therefore the multiresolution representation of the curve. We start with the initial rectangular (box), form the piecewise polynomial approximation based on the corner values, and measure the symmetric difference (the area of places where the smooth function and its approximation have different sign). If the symmetric difference is less than a given tolerance, stop the process. Otherwise, divide the box into four equal partitions and repeat the above approximation procedure for each sub-box. We terminate this process when the stopping criterion is satisfied in every box. In this step, we build up a multiresolution representation of the smooth function as well as the curve.

Step 3: Code the multiresolution representation by standard coding techniques, such as Huffman coding, which is described in Vitter, J. S., *Design and Analysis of Dynamic Huffman Codes*, Journ. ACM (Association of Computer Machinery), Vol. 34, No. 4, pp. 825–845 (October 1987) (Vol. 34, No. 4 being incorporated herein by reference).

This compression technique has certain advantages over the standard curve compression methods such as tracking. First, this compression can easily handle topological changes in the curves such as merging and, breaking while other methods usually have difficulties with this. Second, it is much easier for this method to evaluate the geometry of the curves, since the smooth function whose zero-level set defines the curve is known explicitly on a grid. We can thus compute numerical approximations to its derivatives on this grid, evaluate them on the zero-level set, and thus compute the geometry of the curve. Third, it has a multiresolution representation.

The method goes over immediately to three dimensions, except that we recursively divide the original rectangular parallelepiped into eight equal rectangular parallelepipeds. Then we divide each of these eight into polyhedra and use polynomial interpolation in each polyhedron, in a fashion similar to that used in the marching cubes algorithm. See Lorenson, W. E. and Cline, H. E., *Marching Cubes, A High-Resolution 3D Surface Construction Algorithm*, Computer Graphics (Proceedings of SIGGRAPH 87, Vol. 21, No. 4, pp. 163–169 (1987)) (Vol. 21, No. 4 being incorporated herein by reference). The rest of the above statements go over word for word from two to three dimensions.

We combine the feature-based quantization technique and the curve or surface level set based compression to compress and decompress images (for curves) or videos for (surfaces). The procedure is as follows:

Step 1: Use the feature-based quantization method to quantize the image or video. We obtain N contours, which are curves (for images) or surfaces (for videos).

Step 2: Compress these N contours using the level set based compression of curves or surfaces. We may use other methods to compress the level contours. If we have a good approximation to the contours we can reconstruct the features in the image, keeping edges and features sharp.

Step 3: Reconstruct the image or video using a nonoscillatory reconstruction. Several techniques are available for this. One technique is just piecewise linear interpolation using the distance function between the contours. Higher order accurate essentially nonoscillatory interpolation is also possible. Another technique is to solve a discrete approximation to Laplace's equation with the data given on the N contours.

Feature-Based Quantization

An advantage of the feature-based quantization of the invention is the retention of the most significant and important features in the quantized data (e.g. in images) by selecting a smaller set of values so as to preserve features.

Figure 1:
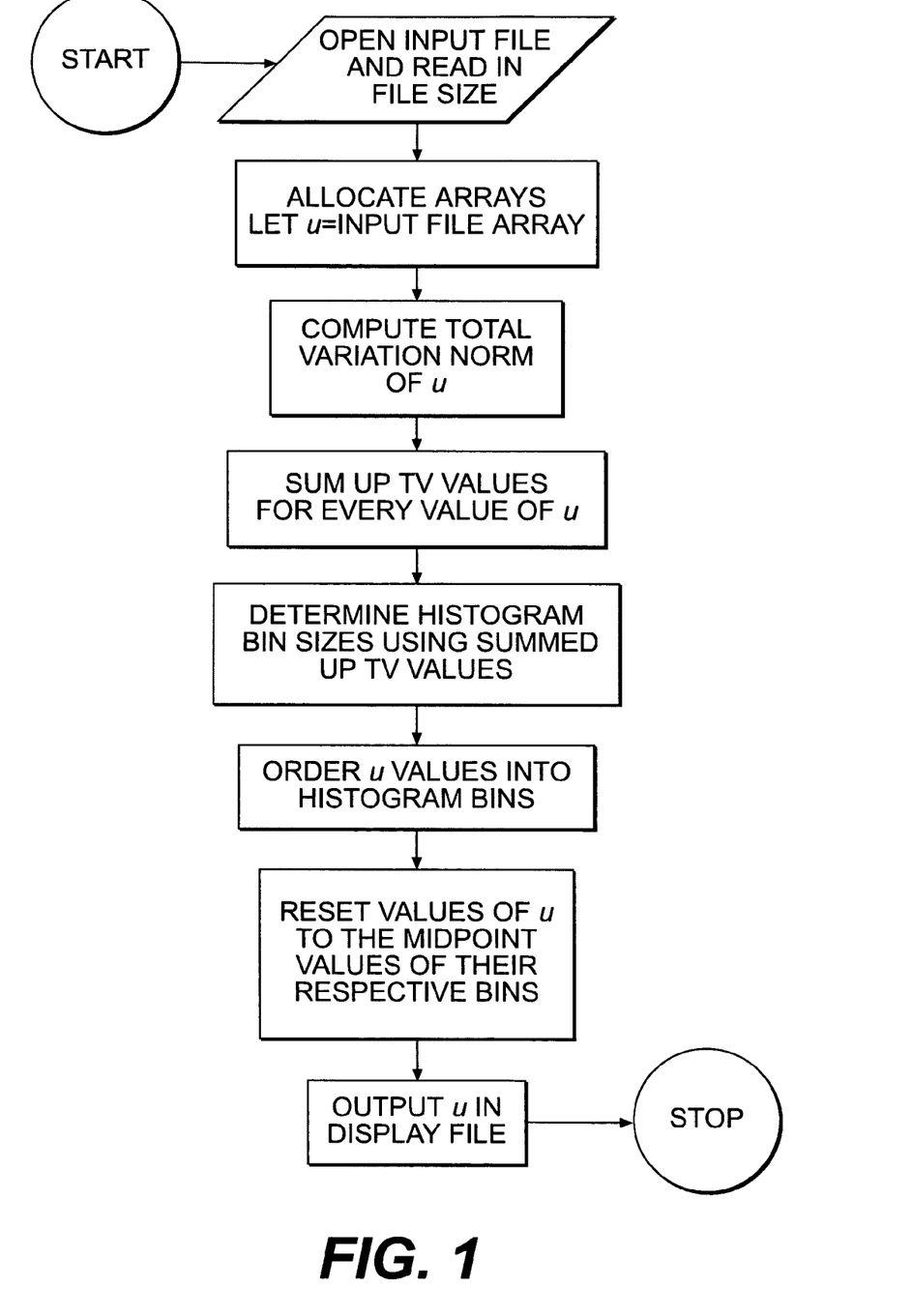
FIG. 1 is a flow chart of a quantization method of the invention.

The feature-based quantization may be understood by reference to the flow chart of FIG. 1 of the drawings, and to the pseudocode attached hereto as Appendix A.

In the following discussion, these definitions will be used:

| | |
|---|---|
| u = | data set to be quantized |
| u[i][j] = | value of the data at the pixel or point (i,j) |
| u_min = | minimum value of u[i][j] |
| u_max = | maximum value of u[i][j] |
| α = | positive parameter used to balance 2 kinds of features: large are and high contrast variance. |
| N = | number of data values in the quantized set |
| TV = | total variation, i.e. the total amount the data varies. For u, this can be calculated by approximating the norm of the gradient of u. |
| S = | bin size of the histogram |

An important measure M_TV(x) is defined by:

$$M\_TV(x)=\alpha\cdot(\text{number of } u[i][j])+\text{sum } TV(u[i][j]) \text{ for } u[i][j]<=x$$

Figure 2:
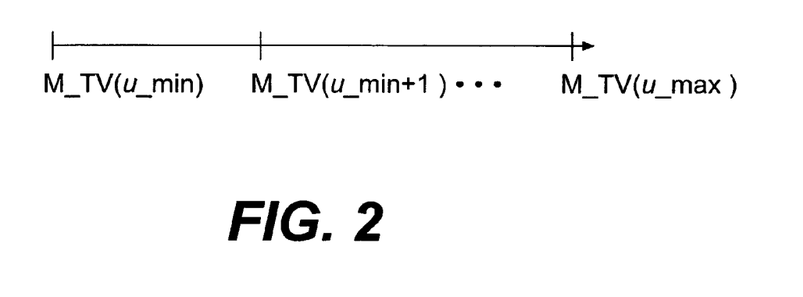
FIGS. 2–4 are diagrams illustrating aspects of data quantization procedures according to the invention.

The N values are selected in the following manner. M_TV is used to equally partition u[i][j] into N histogram bins. Note that M_TV(x) is a monotonically increasing sequence, so its values from x=u_min to x=u_max can be placed in increasing order. For illustration, consider a number line as in FIG. 2. In this case, the last value M_TV(u_max) can be divided by (N-1) to get the bin size (denoted by S):

$$S=M\_TV(u\_max)/(N-1)$$

Figure 3:
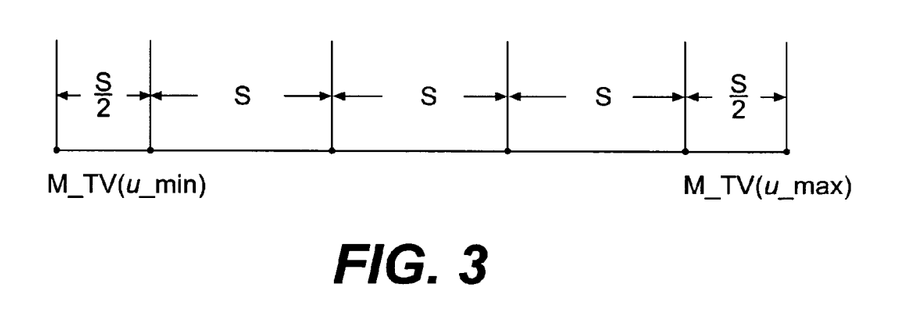

Preferably, the bins are partitioned, as represented in FIG. 3, so that the first and last bins are of size S/2 and all other bins are of size S (though other partitioning schemes are possible). In FIG. 3, M_TV(u_min) corresponds to $d_0$=u_min, and M_TV(u_max) corresponds to $d_N$=u_max. Thus, there are N bins altogether. Associated with each bin are endpoints corresponding to M_TV(x) values. The associated x values of these endpoints are stored, and may be referred to as the dividing points d(i).

Figure 4:
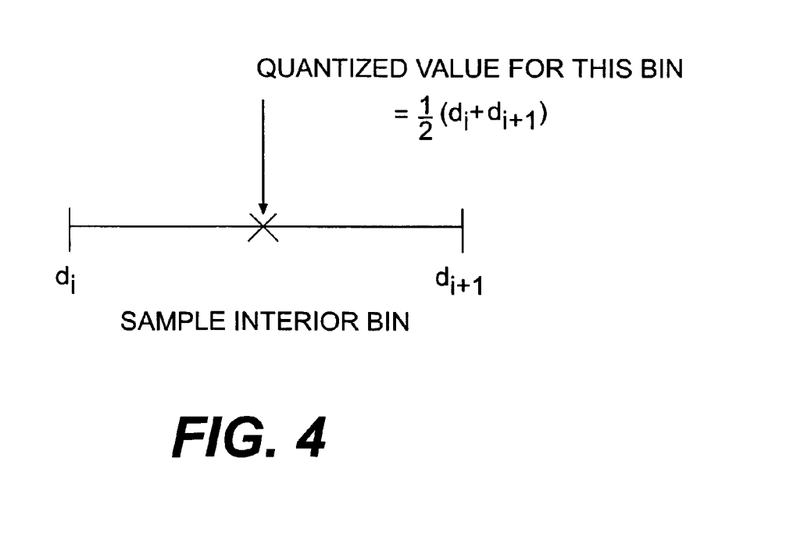

These dividing points determine the quantized values. The first and last values, d(0) and d(N), are kept as quantized values. The remaining quantized values are the midpoints of the intervals defined by the interior dividing points, d(1), d(2), d(3), ..., d(N-1). An example of one such bin interior is represented in FIG. 4.

It will be appreciated that the above-described method results in data quantization that is not simply based upon equal-area or equal-length divisions of an image, as with prior systems; rather, it efficiently quantizes such images based upon variations in the features of the images themselves. This can greatly reduce the amount of information needed to store the compressed image (e.g. by a factor of five or more), and at the same time can achieve a more accurate representation of an image for a given amount of data compression.

Curve Compression

Figure 5:
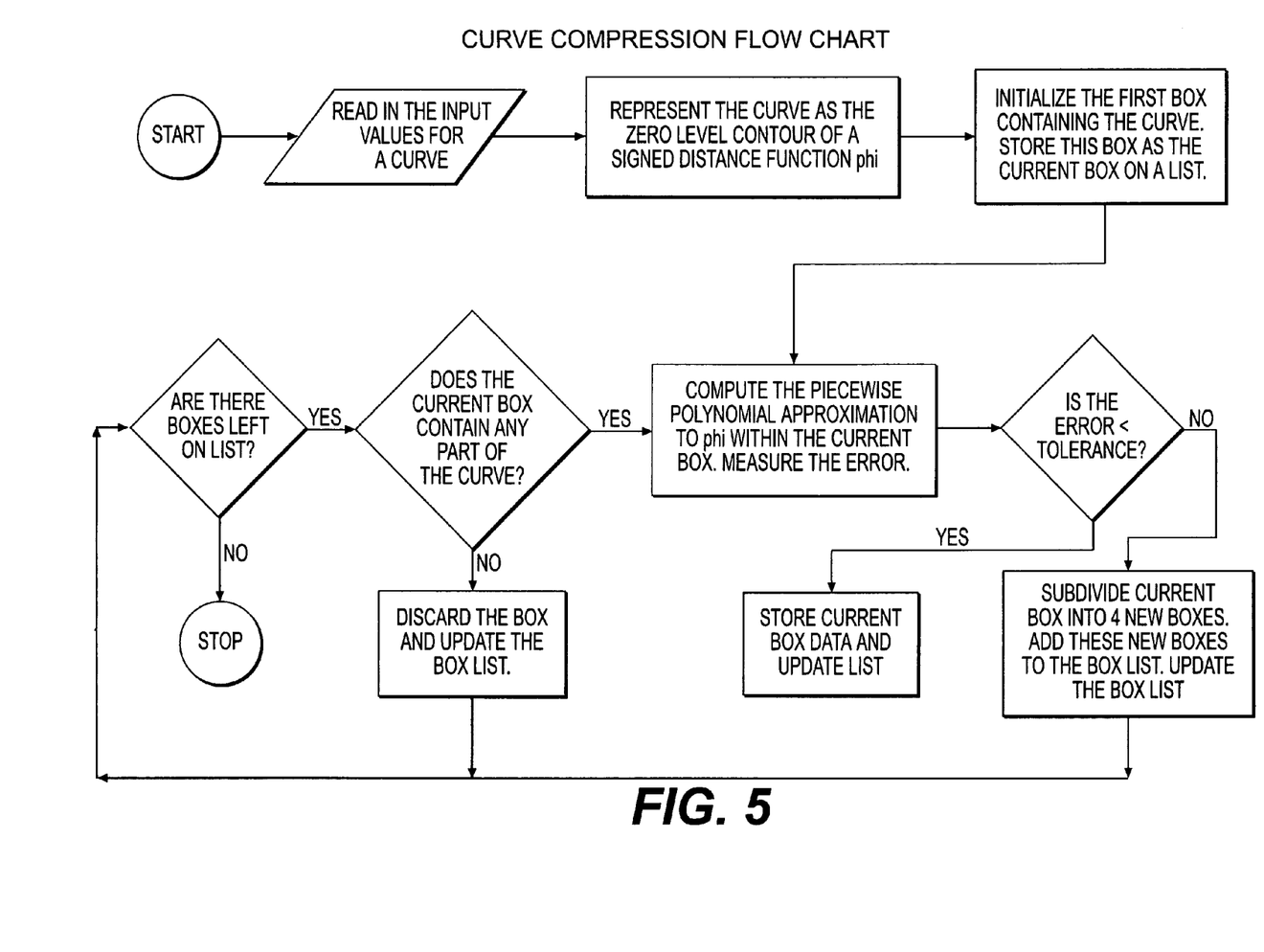
FIG. 5 is a flow chart of a compression method of the invention.

A preferred embodiment of the curve compression method of the invention is represented in the flow chart of FIG. 5. An implementation of the method may be embodied in software or hardware, and in particular may be made by reference to the pseudocode included in Appendix B of this application.

Figure 6:
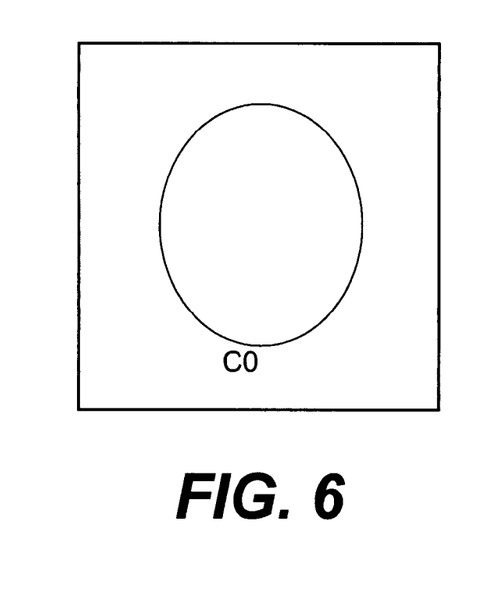
FIGS. 6–14 show curve subdivisions representing curve compression procedures according to the invention.

Generally, given a curve C0 in multidimensional space (see FIG. 6 for a simple example), one can represent it as the zero contour of a signed distance function (level set function) φ. For a generalized curve C, $$C=\{x: \phi(x)=0\}$$

Figure 7:
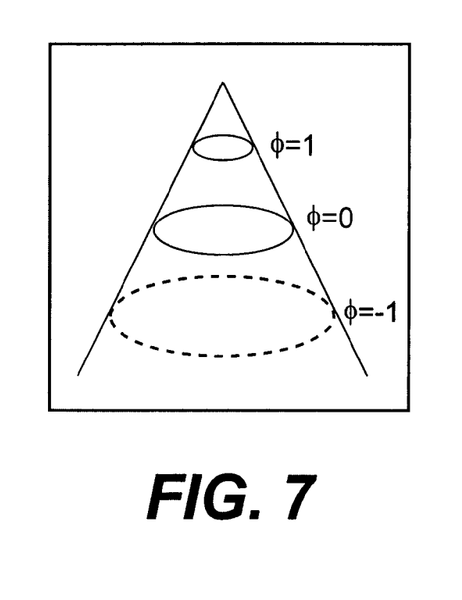

The resulting level set function may be represented as a set of curves, as represented in FIG. 7.

Figure 8:
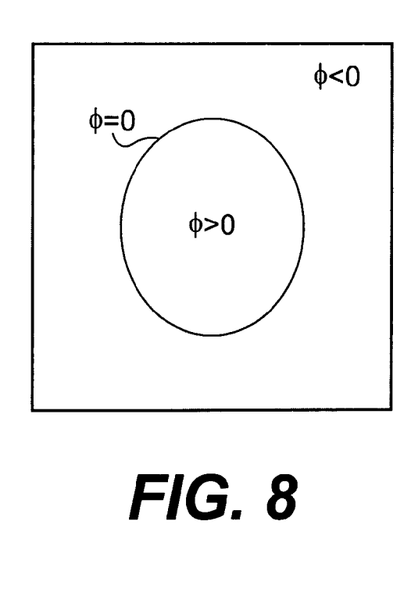

Once φ has been determined, the location of points on the curve C can be approximated by determining where the sign of the function φ changes sign, as represented in FIG. 8.

Figure 9:
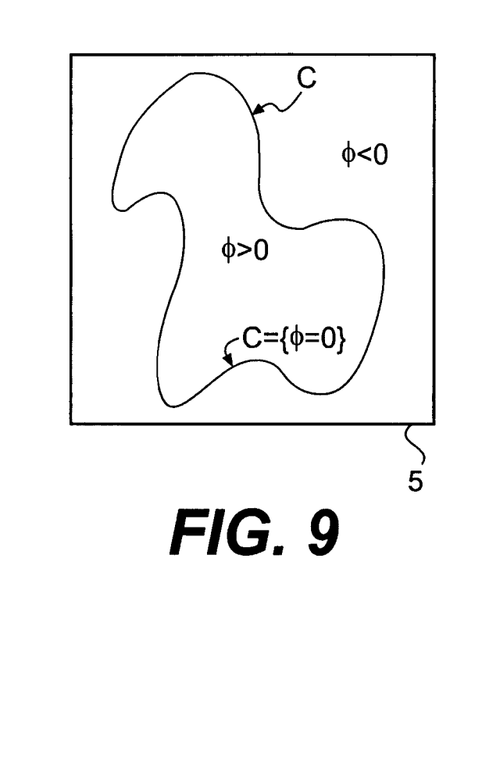
Figure 10:
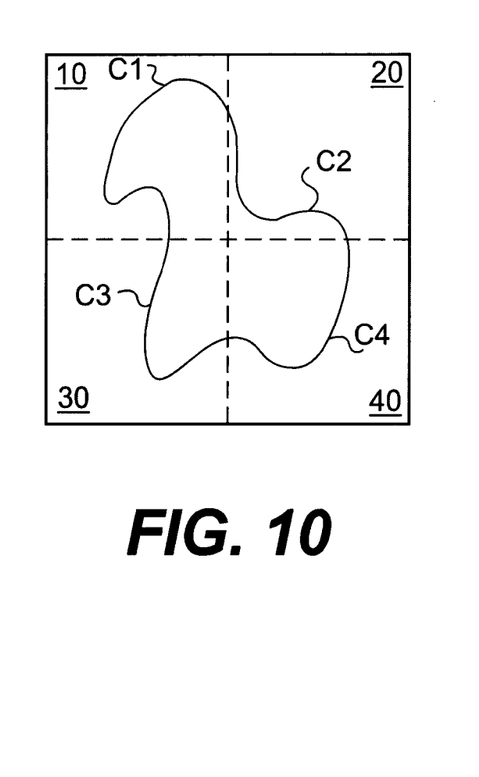

Using this level set approach for representations of curve, such curves can be compressed and stored. For instance, consider a curve C such as that shown in FIG. 9, which illustrates where φ as described above is positive, negative or zero within some box or image boundary 10 defined by a user or automatically generated in compliance with predefined criteria by a system according to the invention. In the present invention, φ can be approximated to an arbitrary degree of accuracy by polynomial interpolants within the box 10. Thus, FIG. 10 shows that box 5 may be subdivided, in this example into four equal, smaller boxes 10–40 (though other subdivisions, including unequal subdivisions, are possible). Each box 10–40 then contains a portion C1–C4, respectively, of the original curve C.

Figure 11:
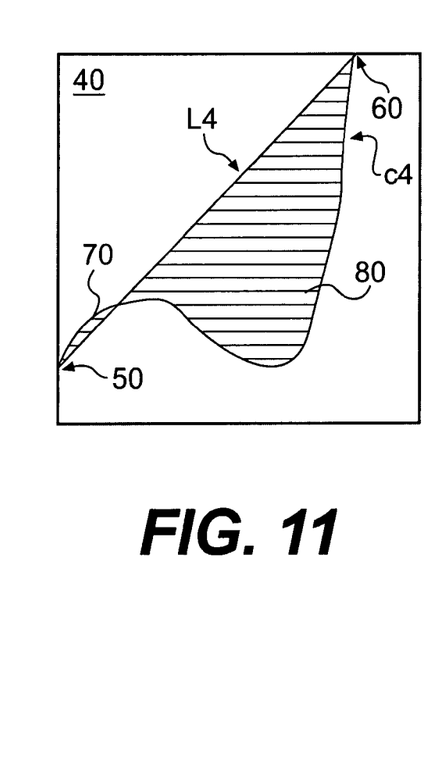

Box 40 is represented in FIG. 11, and a line segment L4 is represented, which is generated by connected the beginning point 50 and endpoint 60 of the curve as it passes through the box. If the curve passes into and out of the box multiple times, then the box may be further subdivided until the curve has only one beginning point and one endpoint within each smaller box or a single beginning point and endpoint may be selected for the error calculation (described below), which will itself results (as will be seen) in further subdivision of the box.

In this case, there is only one beginning point 50 and one endpoint 60 are present in box 40. Error regions 70 and 80 represent the total amount of area between the curve C4 and the line segment L4; this area is determined by adding the (absolute values of) the area differences between the line and the curve, in a conventional manner (which may often be carried out analytically, but at least may be accomplished numerically).

In the present invention, a predefined error is used to determine whether each line segment such as L4 is too far from its corresponding curve C4 to generate a compressed curve representation within a desired accuracy. This predefined error will be selected based upon particular needs of the application at hand, and thus its actual dimensions will also be application-specific.

Figure 12:
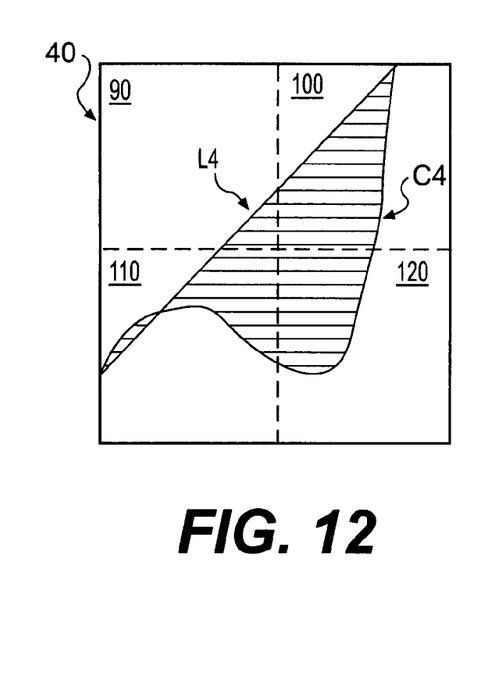
Figure 13:
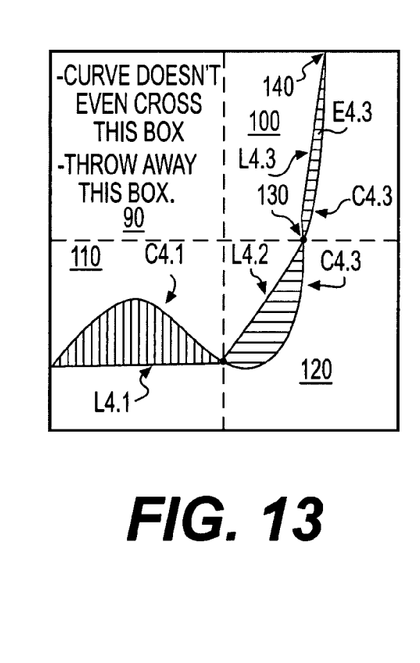

If the total area between the line segment (here, L4) and the curve (C4) is larger than the predefined allowable error, then the box 40 is further subdivided as described above, such as into four smaller, equal-area boxes 90–120 (though, again, other subdivisions, including unequal subdivisions, are possible), as represented in FIG. 12. The line segment L4 is then replaced by the line segments L4.1, L4.2 and L4.3, corresponding to curve segments C4.1, C4.2 and C4.3, respectively, as shown in FIG. 13. The line segments L4.1-L4.3 are formed in a manner analogous to line segment L4 of FIG. 11.

Note that the curve segment C4 (and the curve C as a whole) does not cross box 90 in FIG. 13; in this case, any data relating to box 90 may be discarded, and need not be stored for an accurate representation of the compressed curve C.

In box 100, the error region E4.3 is fairly small, since the curve segment C4.3 is nearly a straight line in this box. In this case, it may be that the error is less than the predefined error, and this the information relating to the beginning point 130 and endpoint 140 are stored as the information representing the curve region C4.3. The approximation can, as mentioned, be made arbitrarily accurate by appropriate selection of the error values. Note that the error values at each lower level of box subdivision may generally be different (e.g. at finer levels of subdivisions, smaller error values may be used, such as in a ratio to the larger error values corresponding generally—or exactly equal—to the ratio of a given smaller box area to the corresponding larger box area for which an error has been defined). Such errors may be automatically generated or may be individually selected by a user, or some combination of both.

In boxes 110 and 120 of FIG. 13, it may be that the respective errors exceed the relevant predefined errors, in which case these boxes would be further subdivided, and the procedure described above iteratively repeated until the errors are within the desired ranged.

Note that other types of curve segments may be used instead of line segments. For instances, generalized curves such as circles, ellipses, parabolas or other conic sections, or curves represented by generalized polynomials, can be used as approximations to segments of the original curve to be represented, in which case the appropriate respective formulas for such generalized curves would be associated in each case with the respective curve segments. Such generalized curves can be selected by a user or automatically by a program, circuit or computer implementing the invention, so as to best approximate each curve segment in question and minimize the resultant error. This can lead to further savings of storage space or memory, since a large segment of the curve C might be able to be represented by a single formula (e.g. a parabolic section) rather than many smaller line segments, each with its own endpoints.

Figure 14:
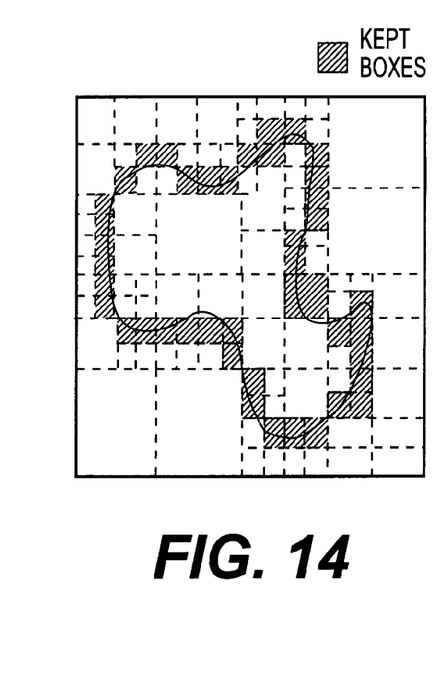

This method is carried out for the entire curve C, and the result is data files or other appropriate representation of the curve C, with each approximating segment stored in a manner such that an approximation of the original curve can be reconstructed and represented to the desired degree of accuracy. FIG. 14 represents the original curve C with the corresponding subdivided boxes as described above, each containing some segment of C and corresponding to some approximation of C for that segment.

The method can be carried out in an analogous manner for images of greater numbers of dimensions, e.g. for three-dimensional solids.

Figure 15:
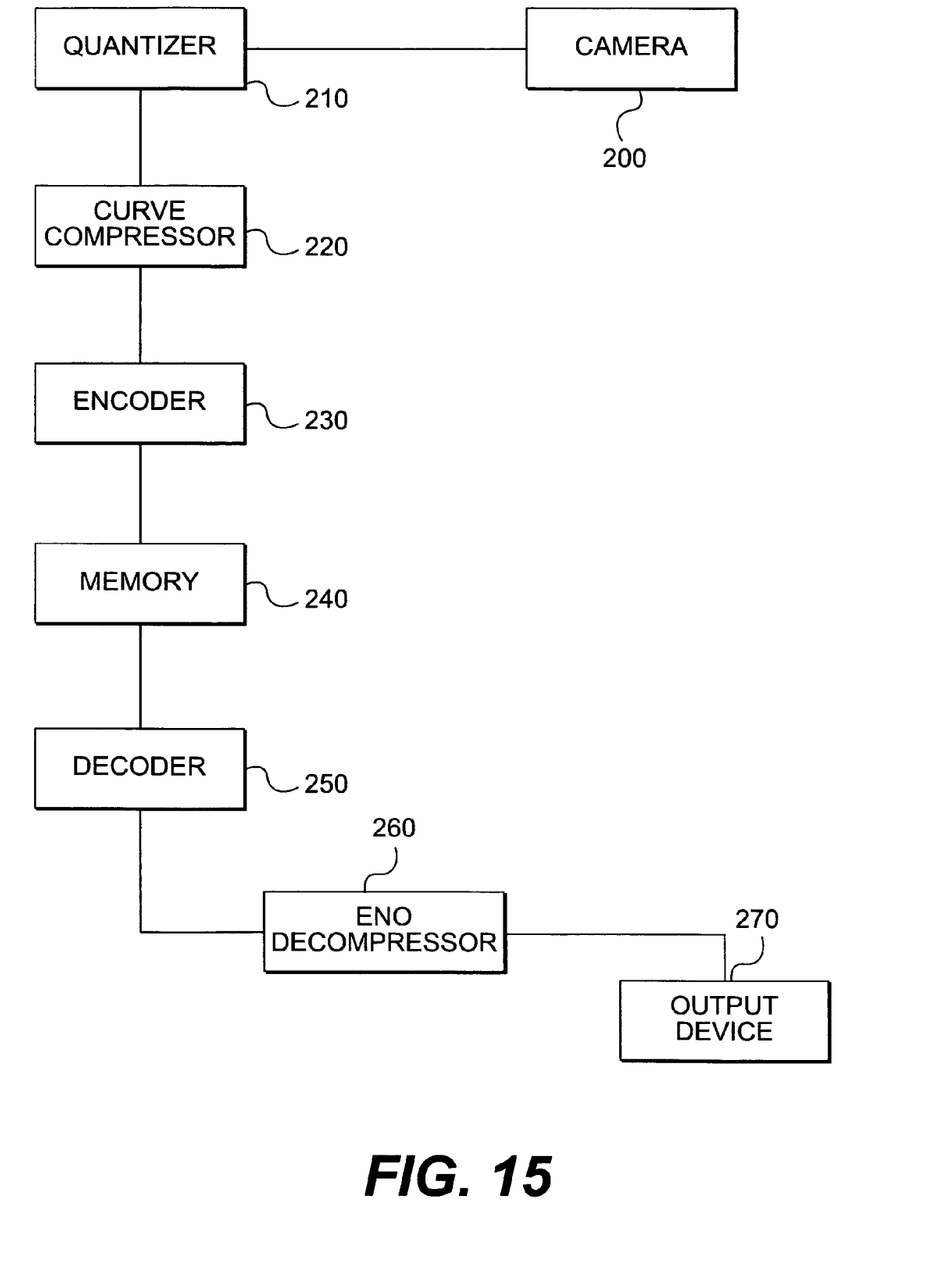
FIG. 15 is a block diagram depicting hardware implementing a preferred embodiment of the invention.

FIG. 15 is a block diagram of an appropriate hardware implementation incorporating the invention. A camera 200 or other image-forming device (CCD array, scanner, or analogous image digitizers) forms a binary or digitized image, represented by a file or data stream provided to a quantizer 210, which carries out the data quantization method described above. Quantizer 210, as well as any of the blocks appearing in FIG. 15, includes hardware, firmware, and/or software appropriate to implementing the appropriate portion(s) of the method of the invention.

The resulting data is provided as input to a curve compressor 220, which carries out the compression method described above. Encoder 230 then encodes the data into a predetermined format as needed, which is then stored in memory 240 and/or on some storage medium. Any minimum-redundancy encoder, or other encoder implementing a compression scheme (preferably but not necessarily lossless), would be suitable.

When the image is needed, the data file is retrieved from memory 240, and is provided to decoder 250, which converts the data into appropriate format for decompression. The converted data is provided as input to the ENO decompressor 260, where an approximation to the original curve is regenerated, and is provided to an output device 270, such as a display, a printer, or other device by which the resulting image can be viewed.

In the present invention, and thus in FIG. 15, the quantization and curve compression portions of the invention may be used independently of one another. Thus, a given image may be curve-compressed without using the data quantization represented by block 210 (and by the flow chart of FIG. 1), or alternatively the curve may be data-quantized without being curve-compressed. Optimal results are achieved by using both the data quantization and the curve compression procedures described above, e.g. very accurate images stored in a highly compressed form.

What is claimed is:

1. A method for quantizing and compressing an individual image, including the steps of:
   selecting a set of contour curves for the image;
   generating a representation of the image correlated with the contour curves and based upon at least one predetermined feature-oriented criterion of the image;
   storing the generated representation of the image;
   generating a further representation of the stored image as a zero-level contour; and
   generating a multiresolution representation of the zero-level contour.

2. An apparatus for quantizing an individual image in a processor-based system, including:
   a first module configured to select a set of contour curves for the image;
   a second module configured to generate a representation of the image correlated with the contour curves and based upon at least one predetermined feature-oriented criterion of the image; and
   a third module configured to the generated representation of the image, whereby the representation of the image is compressible based on a zero-level contour associated with the representation of the image.

3. An apparatus for compressing an individual image in a processor-based system, including:
   a first module configured to generate a representation of the image as a zero-level contour; and
   a second module configured to generate a multiresolution representation of the zero-level contour.

4. The apparatus of claim 3, further including a third module configured to encode the multiresolution representation.

5. An apparatus for quantizing and compressing an individual image, including:
   a first module configured to generate a set of contour curves for the image;
   a second module configured to generate a representation of the image correlated with the contour curves and based upon at last one predetermined feature-oriented criterion of the image;
   a third module configured to store the generated representation of the image;
   a fourth module configured to generate a further representation of the stored image as a zero-level contour; and
   a fifth module configured to generate a multiresolution representation of the zero-level contour.

* * * * *